US009098980B2

(12) United States Patent
Doig et al.

(10) Patent No.: US 9,098,980 B2
(45) Date of Patent: Aug. 4, 2015

(54) MOBILE BINGO GAME WITH TIME PENALTY FOR MISSED MARKERS

(75) Inventors: Brian Doig, Burbank, CA (US); Richard K. Skala, Costa Mesa, CA (US); John E. Cibulski, Los Angeles, CA (US); Michael D. Kocel, Los Angeles, CA (US); Christie S. Tyler, Malibu, CA (US)

(73) Assignee: Playtika Santa Monica, LLC, Las Vegas, NV (US)

( * ) Notice: Subject to any disclaimer, the term of this patent is extended or adjusted under 35 U.S.C. 154(b) by 74 days.

(21) Appl. No.: 13/489,231

(22) Filed: Jun. 5, 2012

(65) Prior Publication Data

US 2013/0324210 A1 Dec. 5, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63F 3/06*** | (2006.01) |
| ***G07F 17/32*** | (2006.01) |

(52) U.S. Cl.

CPC .................................. *G07F 17/3293* (2013.01)

(58) Field of Classification Search

CPC ............ G07F 17/3244; G07F 17/3267; G07F 17/3286; G07F 17/3211; G07F 17/3258

USPC ............................................. 463/19; 273/269

See application file for complete search history.

(56) References Cited

U.S. PATENT DOCUMENTS

| | | | | |
|---|---|---|---|---|
| 4,651,995 | A | 3/1987 | Henkel | |
| 5,072,381 | A | 12/1991 | Richardson et al. | |
| 5,518,253 | A | 5/1996 | Pocock et al. | |
| 6,581,935 | B1 | 6/2003 | Odom | |
| 6,645,072 | B1 | 11/2003 | Kellen | |
| 6,755,738 | B2 | 6/2004 | Glasson et al. | |
| 7,059,966 | B2 | 6/2006 | Luciano, Jr. et al. | |
| 7,118,477 | B1 | 10/2006 | Kellen | |
| 7,222,078 | B2 | 5/2007 | Abelow | |
| 7,620,565 | B2 | 11/2009 | Abelow | |
| 7,708,631 | B2 | 5/2010 | Lind et al. | |
| 7,892,085 | B2 | 2/2011 | Harris | |
| 2002/0113369 | A1 | 8/2002 | Weingardt | |
| 2004/0121834 | A1 | 6/2004 | Libby et al. | |
| 2004/0178579 | A1 | 9/2004 | Lowell et al. | |
| 2007/0257430 | A1 * | 11/2007 | Hardy et al. | 273/139 |
| 2011/0263312 | A1 * | 10/2011 | De Waal et al. | 463/20 |

OTHER PUBLICATIONS

European Patent Office; International Search Report and Written Opinion; PCT Application No. PCT/US2013/044276; Sep. 2, 2013.

* cited by examiner

*Primary Examiner* — Kevin Y Kim

(74) *Attorney, Agent, or Firm* — Fenwick & West LLP

(57) ABSTRACT

A method for controlling a bingo game comprising randomly selecting a first game number representing one of a predetermined set of game numbers. Displaying the first game number in an active number area. Receiving a user-entered command to randomly select a second game number. Determining whether the first game number has been marked on each of one or more bingo game cards. Randomly selecting a second game number representing a second of the predetermined set of game numbers, if the first game number has been marked where it appears on each of the one or more bingo game cards. Deducting a predetermined time penalty from a countdown timer if the first game number has not been marked where it appears on each of the one or more bingo game cards.

20 Claims, 4 Drawing Sheets

MOBILE BINGO GAME WITH TIME PENALTY FOR MISSED MARKERS

TECHNICAL FIELD

The present disclosure relates to gaming systems and methods, and more specifically to a mobile bingo game system and method.

BACKGROUND OF THE INVENTION

Mobile gaming systems are related to online gaming systems, and have some common features that can be used. However, many online gaming systems include features that cannot be implemented in a mobile gaming system, and which are an impediment to providing an effective mobile gaming system that provides the same user experience as the online gaming system.

SUMMARY OF THE INVENTION

A method for controlling a bingo game comprising randomly selecting a first game number representing one of a predetermined set of game numbers. Displaying the first game number in an active number area. Receiving a user-entered command to randomly select a second game number. Determining whether the first game number has been marked on each of one or more bingo game cards. Randomly selecting a second game number representing a second of the predetermined set of game numbers, if the first game number has been marked where it appears on each of the one or more bingo game cards. Deducting a predetermined time penalty from a countdown timer if the first game number has not been marked where it appears on each of the one or more bingo game cards.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
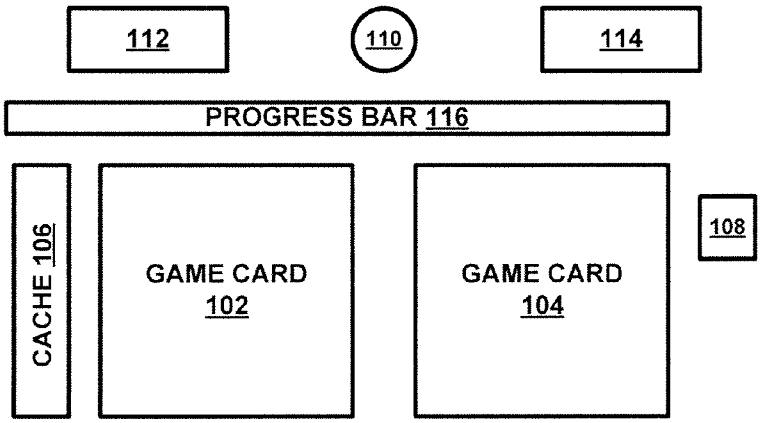
FIG. 1 is a diagram of a mobile bingo board in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a mobile bingo board 100 in accordance with an exemplary embodiment of the present disclosure. Bingo board 100 can be a graphic user interface generated on the video screen of a personal computer, the video screen of a cellular telephone, a television, or other suitable displays.

Bingo board 100 includes game cards 102 and 104, which can be implemented as one or more independent objects having graphical and metadata attributes, such as to allow the appearance of each of game card 102 and 104 to be independently changed, to allow data and controls to be associated with each of game card 102 and 104, and to provide other functionality as described in further detail herein. Although two game cards 102 and 104 are shown, additional game cards can be provided in a suitable manner. In one exemplary embodiment, additional game cards can be disposed "under" game cards 102 and 104, such that a user can view the additional game cards by scrolling the game card display in a suitable manner, such as by pressing a user control on the device associated with the video screen on which Bingo board 100 is generated, by interacting with a touch screen interface of the device, by receiving a verbal command, or in other suitable manners. Likewise, other user controls can be associated with game cards 102 and 104, such as to allow users to interact with game cards 102 and 104 to perform user-selected functions, such as to select numbers on game cards 102 and 104 that correspond to a ball that has been called. In one exemplary embodiment, a user can touch a number on a touch screen display that matches a ball that has been called, such as where a bingo game controller randomly selects numbers from 1 to 75 that correspond to number shown on a bingo card. The numbers can be associated with a set of variables that represent available numbers for a bingo game, where each variable has associated states that indicate whether the number has been called for a current bingo game. In this exemplary embodiment, as each number is selected to be displayed, the state associated with the number can be changed from a state that indicates that the number is available to be selected to a state that indicates that the number is not available to be selected. In this manner, the random numbers generated with each successive ball selection will be decreased by one with each selection, where the first ball is selected from one of 75 available balls (representing balls B-1 to B-15, I-16 to I-30, N-31 to N-45, G-46 to G-60 and O-61 to O-75), the second ball is selected from one of 74 available balls and so forth. The remaining balls can be mapped to the next random number to be selected. For example, if two numbers have been selected representing balls B-2 and B-3, a random number will be generated to select from 73 remaining balls. If the random number is 2, then that selection can be mapped to the next available ball, or ball B-4. Other suitable processes can also or alternatively be used.

Bingo board 100 includes current ball display 110, which can be implemented as one or more independent objects having graphical and metadata attributes, such as to allow the appearance of current ball display 110 to be independently changed, to allow data and controls to be associated with current ball display 110, and to provide other functionality as described in further detail herein. Likewise, user controls can be associated with current ball display 110, such as to allow users to interact with current ball display 110 to perform user-selected functions.

Ball control 108 can be implemented as one or more independent objects, each having graphical and metadata attributes, such as to allow the appearance of ball control 108 to be independently changed, to allow data and functionality to be associated with ball control 108, and to provide other functionality as described in further detail herein. Although one ball control 108 is shown, additional ball controls can be provided in a suitable manner. In one exemplary embodiment, ball control 108 allows a user to cause a new ball to be displayed in current ball display 110, such as by receiving a user touch screen command associated with the location of ball control 108 on a touch screen display, by receiving a user command through a keyboard control or other interface device, by receiving a verbal command, or in other suitable manners. Likewise, user controls can be associated with ball control 108, such as to allow users to interact with ball control 108 to perform user-selected functions.

Cache 106 can be implemented as one or more independent objects having graphical and metadata attributes, such as to allow the appearance of cache 106 to be independently changed, to allow data and functionality to be associated with cache 106, and to provide other functionality as described in further detail herein. Although one cache 106 is shown, additional caches can be provided in a suitable manner. In one exemplary embodiment, cache 106 allows balls that have previously been displayed in current ball display 110 to be shown in the order that they have been presented. As the number of balls displayed in cache 106 increases beyond the number that can be shown on bingo board 100, additional balls can be displayed in response to a user command to "scroll" cache 106 upwards or downwards, such as by receiving a user touch screen command associated with cache 106 on a touch screen display, by receiving a user command through a keyboard control or other interface device, by receiving a verbal command, or in other suitable manners. Likewise, user controls can be associated with cache 106, such as to allow users to interact with cache 106 to perform user-selected functions.

Progress bar 116 can be implemented as one or more independent objects having graphical and metadata attributes, such as to allow the appearance of progress bar 116 to be independently changed, to allow data and functionality to be associated with progress bar 116, and to provide other functionality as described in further detail herein. Although one progress bar 116 is shown, additional progress bars can be provided in a suitable manner. In one exemplary embodiment, progress bar 116 shows the number of markers or daubs that have been played on game cards 102 and 104 to be displayed, the number of bingo balls that have been called to be displayed, or other suitable data to be displayed. Unlike previous displays that show the number of bingo balls that have been called using a table that displays all available bingo balls, and which changes the display state of the table entries as the balls are called, progress bar 116 provides a simple and novel metric to aid the user in determining the status of the game. Likewise, user controls can be associated with progress bar 116, such as to allow users to interact with progress bar 116 to perform user-selected functions.

In one exemplary embodiment, the appearance of the markers can be modified by the user, such as by an algorithm that allows that user to select a marker customization routine. In this exemplary embodiment, a graphic interface can be generated by the algorithm that includes user-selectable controls that allow the user to select one of a predetermined set of marker designs, to create a unique marker design, to download an image file for use as a marker, to save a selected or created marker, or to otherwise control the appearance of the marker.

Countdown timer 112 can be implemented as one or more independent objects having graphical and metadata attributes, such as to allow the appearance of countdown timer 112 to be independently changed, to allow data and functionality to be associated with countdown timer 112, and to provide other functionality as described in further detail herein. Although one countdown timer 112 is shown, additional timers can be provided in a suitable manner. In one exemplary embodiment, countdown timer 112 shows the amount of time remaining in a mobile bingo game, such as the amount of time left for a player to request additional bingo balls and to fill out corresponding spaces on game cards 102 and 104. Likewise, user controls can be associated with countdown timer 112, such as to allow users to interact with countdown timer 112 to perform user-selected functions. In another exemplary embodiment, countdown timer 112 can change state at a predetermined time, such as when 10 seconds or other suitable time periods remain in the game. In this exemplary embodiment, countdown timer 112 can include an algorithm that compares the current time to a predetermined time, and when the current time matches the predetermined time, the algorithm can modify one or more state variables of a graphical display object to cause countdown timer 112 to be enlarged, to include flashing on-screen displays, to provide an audible signal, or to provide other suitable features in a manner to improve the visibility of countdown timer 112 to the user. The configuration of countdown timer 112 can also or alternatively be controlled by the user, such as to allow the user to select the time at which countdown timer changes state, the features that will be provided, or to provide other suitable user-selected configurations.

Power-up display 114 displays the progress toward a "power-up" or in-game reward, and can be implemented as one or more independent objects having graphical and metadata attributes, such as to allow the appearance of power-up display 114 to be independently changed, to allow data and functionality to be associated with power-up display 114, and to provide other functionality as described in further detail herein. Although one power-up display 114 is shown, additional timers can be provided in a suitable manner. In one exemplary embodiment, power-up display 114 shows the progress towards the availability of a power-up or in-game reward, such as a shadow marker that can be randomly assigned to a number on one or more of game cards 102 and 104. In this exemplary embodiment, as players mark spaces on game cards 102 and 104, credits towards a power-up or in-game award can be awarded until a player has accumulated enough credits to receive a power-up or in-game award. Likewise, user controls can be associated with power-up display 114, such as to allow users to interact with power-up display 114 to receive the power-up or in-game award or to perform other user-selected functions.

In one exemplary embodiment, power-ups or in-game awards can be saved, such as to allow a user to use a power-up or in-game award that was awarded in a first game in a second or subsequent game. In this manner, the user can store power-ups or in-game awards for use in later games. In addition, the power-ups can also or alternatively be purchased by the user, such as by using account credits, by using legal currency, or in other suitable manners. The power-ups or in-game awards can also or alternatively be provided with a time limit, such as a number of days over which the power-up or in-game award can be redeemed. The power-up or in-game award can also or alternatively be limited to being used in predetermined play areas or "rooms." Power-up or in-game award features such as these can be implemented as an algorithm that generates user-selectable controls on a graphical object for activating the power-up or in-game award, an algorithm that includes a timer function for determining whether the power-up or in-game award is still valid and for deleting the power-up or in-game award after it has expired, an algorithm for checking a room type variable or data field to determine whether the power-up or in-game award can be used in a given playing area, or other suitable algorithms.

In operation, mobile bingo board 100 provides features for a mobile bingo game that allows a user to play in a competitive environment without requiring real-time access to an interactive gaming environment. Although the features of mobile bingo board 100 have been described in conjunction with a mobile bingo game, these features can also or alternatively be used with other suitable mobile games, in an online bingo game, or in other suitable online games.

In one exemplary embodiment, a user can initiate a game using mobile bingo board 100 by selecting a number of game cards to be played. In this exemplary embodiment, a user can select from one to six cards, where two cards can be shown side-by-side and where additional sets of two cards are "stacked" underneath and on top of each other, so as to allow a user to access additional sets of two cards by "scrolling" the cards up or down on mobile bingo board 100.

Play then starts when a first bingo ball is called. As previously described, the bingo ball can be called by randomly generating a number between one and 75, where a standard bingo game is being simulated. Likewise, additional balls can also or alternatively be called, such as balls that provide power-ups or in-game awards. The first bingo ball is then displayed in current ball display 110. The user then reviews the spaces on the user's game cards to determine whether the current bingo ball matches a number shown on the game cards. If the current bingo ball matches a number, the user selects the number, such as by touching the number on a touch screen display to mark the number, or in other suitable manners. In one exemplary embodiment, after all instances of the number have been marked, the user can request the next ball using ball control 108. In another exemplary embodiment, the next ball can be automatically displayed after all instances of the number on the user's game cards have been marked by the user. If all instances of the current ball have not been marked, a time penalty can be assessed against the time remaining on countdown timer 112, so as to create an incentive for the user to completely inspect all game cards before requesting the next ball.

When the next ball has been requested and all spaces corresponding to the current ball have been marked, the game randomly generates a number corresponding to the remaining uncalled bingo balls. As described further herein, the game can be implemented as a software system using algorithms that successively decrease the random number that is generated as each ball is called, so that the second ball is selected from 74 available balls, the third ball is selected from 73 available balls and so forth until the last ball has been called. When a new current ball is called, the previous current ball is then displayed in cache 106, such as by generating a graphic icon representing that ball within cache 106. The previously-called bingo balls can be displayed in reverse order, with the most recently called bingo ball shown at the top of cache 106 and the first bingo ball called at the bottom of cache 106. The number of called bingo balls will eventually exceed the screen display capability of cache 106, and these bingo balls can be displayed by scrolling though the stack of bingo balls, such as by receiving a command from the user by dragging a finger or stylus along cache 106 in an upward or downward motion, which is translated by a touch screen controller into a command to cause the bingo balls in cache 106 to scroll in the selected direction. The cache feature can advantageously be used for games in which the user is allowed to call the next bingo ball even if the current called bingo ball has not been marked on each game card, such as where at least one card has been marked.

As the user fills the bingo game card with marks representing called bingo numbers, the spaces on the bingo game cards will be filled until a "bingo" has occurred, which can be a horizontal, vertical or diagonal line of five marked balls, two diagonal lines (forming an "X" on the card), four marked corners, or a completely filled bingo game card (also referred to as a black out). As the user obtains bingos, the user's score is increased. In addition, as a user correctly marks spaces on the bingo game cards, the users score can be increased. Different scoring increments can be assigned for marking spaces, for obtaining different types of bingos, or in other suitable manners.

In addition, the user can receive additional experience points or power-ups/in-game awards when spaces are marked that have associated power-ups or in-game award indications, described in greater detail herein. Progress bar 116 and power-up display 114 can also be incremented as spaces are marked, balls are called or in other suitable manners.

When countdown timer 112 reaches zero, play can be terminated. In one exemplary embodiment, additional bingo balls can be called and played if the user has received associated power-up or in-game awards allowing for additional play. In this exemplary embodiment, the user can score additional experience points, bingos, power-ups or in-game awards or other suitable scoring components after countdown timer 112 has expired. After completion of play, the user's final score is displayed, and the user can elect to challenge other players, as described in greater detail herein.

Figure 2:
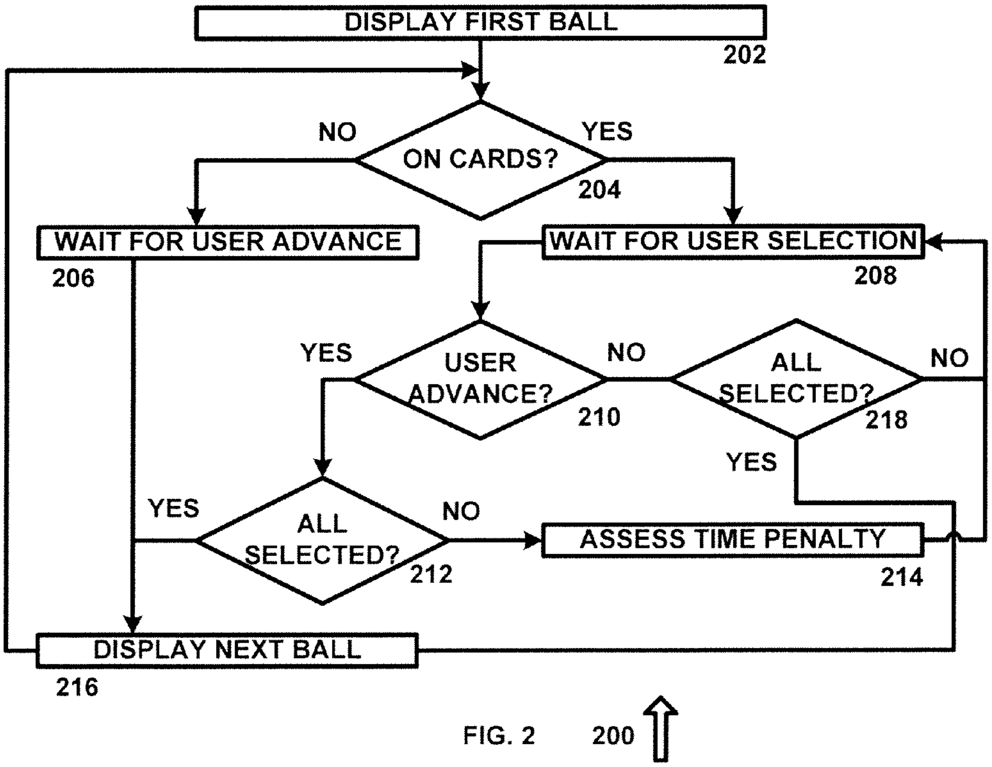
FIG. 2 is a diagram of an algorithm for a mobile bingo application in accordance with an exemplary embodiment of the present disclosure.

FIG. 2 is a diagram of an algorithm 200 for a mobile bingo application in accordance with an exemplary embodiment of the present disclosure. Algorithm 200 can be implemented as software operating on a general purpose processor, a reduced instruction set processor, a digital signal processor, or other suitable processors, can be implemented in hardware, such as a field programmable gate array or an application-specific integrated circuit, or can be implemented in other suitable manners. The algorithm can be implemented using suitable programming processes, such as by defining variables representing the variable values described herein, by defining objects having state data and associated functionality, and by manipulating the variables, objects or other suitable coding constructs to implement the disclosed algorithms.

Algorithm 200 begins at 202, where a first ball icon is displayed, such as on a graphic user display of a personal computer, tablet computer, cellular telephone or other suitable device. The algorithm then proceeds to 204.

At 204, it is determined whether the current displayed ball icon is present on one or more bingo game cards displays. In one exemplary embodiment, the values shown on the game card displays can be compared with the value associated with the current displayed ball, and if the value is present, then the algorithm proceeds to 208. Otherwise, the algorithm proceeds to 206, where the game waits for the user to request the next ball.

At 208, the game waits for the user to take an action, such as a user selection of a space on one or more game cards or a user selection to receive the ball. The algorithm then proceeds to 210, where it is determined whether the user has selected to advance or receive the next ball. Alternatively, the user advance step or control can be omitted, where suitable. If the user has not selected to advance, the algorithm proceeds to 218, where it is determined whether the user has marked all available spaces on all game cards. If all spaces have not been marked, the algorithm returns to 208 to await the next user selection. If all spaces have been marked, the algorithm proceeds to 216. If the user has selected to advance at 210, the algorithm proceeds to 212, where it is determined whether all spaces on game cards that match the current displayed ball have been selected by the user. In one exemplary embodiment, as the user selects spaces on the game cards, the state of those spaces can be changed to show that they have been selected both graphically and logically, so as to allow the spaces on a user's current game cards to be compared with the current displayed ball to determine whether they have been marked. If all spaces on the user's current game cards have not been marked, the algorithm proceeds to 214, where a time penalty is assessed. In one exemplary embodiment, the time penalty can be a predetermined amount of time that is deducted from the time remaining on a count-down clock for the current bingo game. The algorithm then returns to 208. Likewise, a time penalty can be assessed only where at least one space has not been marked, so as to allow the user to progress even if all available spaces on game cards have not been marked. If it is determined at 212 that all spaces have been marked (or at least one space in other exemplary embodiments), the algorithm proceeds to 216, where the next ball is displayed. As discussed above, the next ball can be randomly selected from a set of objects, an array or other programming constructs that represent the available balls remaining in the current bingo game. The algorithm then returns to 204.

At each step or in other suitable manners, the current time of the countdown clock can also be checked to determine whether the game has ended. If it is determined that the game has ended, then no further game-related actions are allowed by the user, such as marking the currently displayed ball, unless a power-up or in-game award has been received by the user to allow the user to place additional markers, to receive additional time, or in other suitable manners.

In operation, algorithm 200 allows users to play a mobile bingo game without requiring online access or other players. Algorithm 200 allows users to control the pace of the game, by allowing the user to select when they want to receive the next ball. In one exemplary embodiment, if the user requests the next ball before marking all instances of the current ball on the user's game cards, algorithm 200 can prevent the user from receiving the next ball until all instances of the current ball have been marked, and can also impose a time penalty to create an incentive for users to completely check their cards before progressing. Likewise, the user can be allowed to progress if no spaces have been marked (such that no time penalty is assessed, or where the time penalty is also assessed), if at least one space has been marked, or in other suitable manners.

Although algorithm 200 is shown as a flowchart, algorithm 200 can also or alternatively be implemented as a state diagram, where the functional and decision blocks are implemented as states or state transitions.

Figure 3:
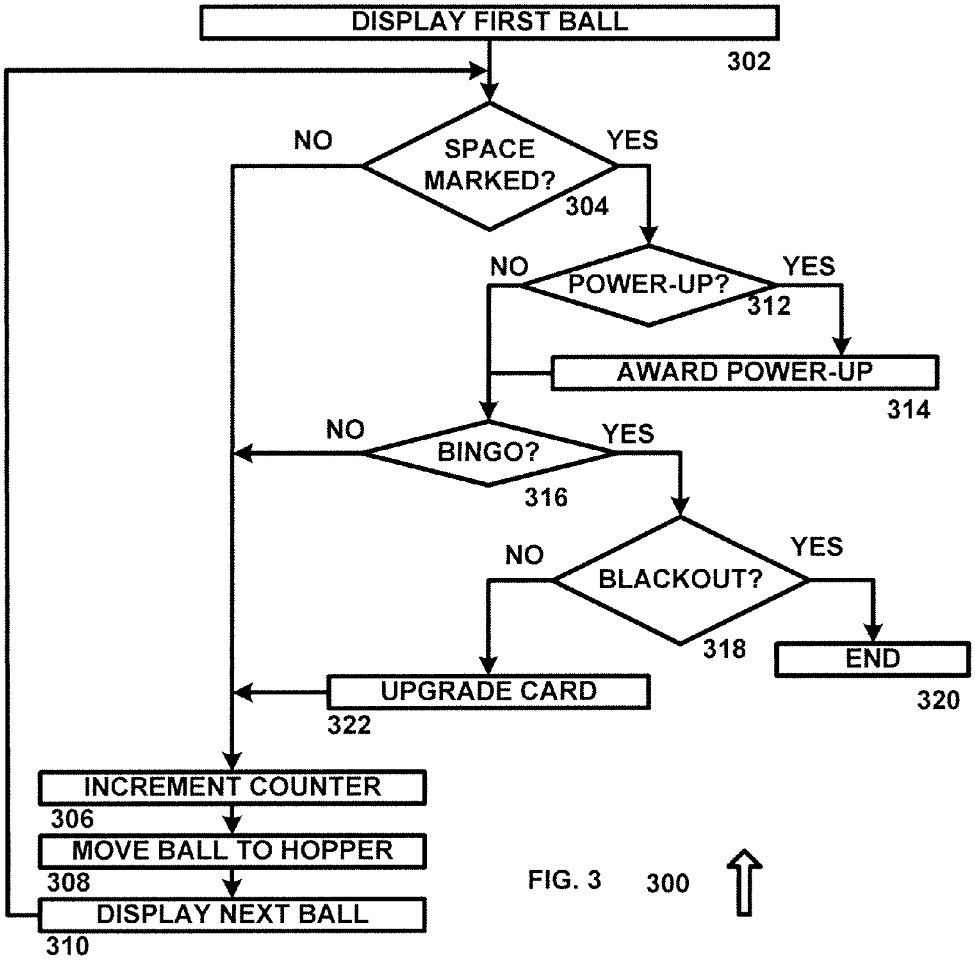
FIG. 3 is a diagram of an algorithm for controlling game play in a mobile bingo application in accordance with an exemplary embodiment of the present disclosure.

FIG. 3 is a diagram of an algorithm 300 for controlling game play in a mobile bingo application in accordance with an exemplary embodiment of the present disclosure. Algorithm 300 can be implemented as software operating on a general purpose processor, a reduced instruction set processor, a digital signal processor or other suitable processors, can be implemented in hardware, such as a field programmable gate array or an application-specific integrated circuit, or can be implemented in other suitable manners. The algorithm can be implemented using suitable programming processes, such as by defining variables representing the variable values described herein, by defining objects having state data and associated functionality, and by manipulating the variables, objects or other suitable coding constructs to implement the disclosed algorithms.

Algorithm 300 begins at 302, where a first ball is displayed, as discussed previously herein. The algorithm then proceeds to 304, where it is determined whether a space has been marked on a game card. If a space has not been marked, the algorithm proceeds to 306, where a counter is incremented, such as to show the progress of game play as a function of the number of balls that have been called, the number of spaces that have been marked, to increase a power-up or in-game award metric, or for displaying other suitable metrics. The algorithm then proceeds to 308, where the currently displayed ball is moved to a hopper. In one exemplary embodiment, when a user activates a control to receive the next ball, the ball that is currently displayed can be "moved" to a cache or hopper, such as by changing the state of a graphical object that represents the current ball to display the next ball and by changing the state of a graphical object that represents the hopper or cache to add the current ball to the hopper or cache. Likewise, other suitable processes can also or alternatively be used, such as allowing a user to "click and drag" the current ball to the hopper or cache, allowing the user to use verbal commands to play the next ball, or using animations to show the movement of the ball from the current ball display to the hopper or cache. The algorithm then proceeds to 310, where the next ball is displayed as the current ball, and the algorithm returns to 304.

If it is determined at 304 that a space has been marked, the algorithm proceeds to 312, where it is determined whether a power-up or in-game award is associated with the marked space. In one exemplary embodiment, the power-up or in-game award can be represented as a shadow feature on a space of a game card, such that when the space is played (i.e., when a ball corresponding to the space is selected and the user marks the space), the power-up or in-game award associated with the shadow feature is awarded to the user. In one exemplary embodiment, the power-up or in-game award can include additional experience points that are awarded to the player, can include additional time that is added to the countdown clock, can include additional balls that are played after the end of the game that allow the user to continue to play without time remaining on the countdown clock, can be an instant win (such as where the user is awarded an instant win for the game card), or can be other suitable in-game awards. If it is determined at 312 that a power-up or in-game award is not associated with the marked space, the algorithm proceeds to 316, otherwise the algorithm proceeds to 314 where the power-up or in-game award is provided and then proceeds to 316.

At 316, it is determined whether the marked space has resulted in a bingo, such as where the marked space forms a line of marked spaces horizontally or vertically across the game card, where the marked spaces form a diagonal line from one corner of the game card to an opposite corner, where the marked spaces form two diagonal lines (forming an "X" on the card), where the marked space completes four marked corners of the game card, where the marked space blacks out the last available space on the game card, or in other suitable manners. If it is determined that a bingo has not resulted, the algorithm proceeds to 306, otherwise the algorithm proceeds to 318, where it is determined whether the bingo is a blackout. If the bingo is a blackout, then the algorithm proceeds to 320 and game play ends for that game card (although game play can continue for other game cards), otherwise, the algorithm proceeds to 322 where the game card is upgraded. In one exemplary embodiment, when a bingo has been obtained on a game card (other than a black out), the player can continue to mark spaces on the game card if time remains in the game, to obtain additional bingos. In this exemplary embodiment, the first bingo may be a line of marked spaces horizontally across the card, such that additional opportunities for bingo exist, such as a vertical bingo, a diagonal bingo and so forth. As additional bingos are obtained by the user, the user can be awarded additional experience points, power-ups or in-game awards, or other suitable game achievements, and the appearance of the game card can also or alternatively be changed, such as the color of the game card, the border of the game card, or other suitable appearance features of the game card. Likewise, the number of bingos can be limited to a sub-set of available bingo types, such as one bingo for any one horizontal line, one bingo for any one vertical line, and so forth. In this exemplary embodiment, while 14 bingos are possible on any given game card (i.e. five horizontal, five vertical, two diagonal, one four corners and one black out), the number of awards can be limited to a subset of the maximum number of possible bingos. The algorithm then proceeds to 306.

At each step or in other suitable manners, the current time of the countdown clock can also be checked to determine whether the game has ended. If it is determined that the game has ended, then no further game-related actions are allowed by the user, such as marking the currently displayed ball, unless a power-up or in-game award has been received by the user to allow the user to place additional markers, to receive additional time, or in other suitable manners.

In operation, algorithm 300 allows users to play a mobile bingo game without requiring online access or other players. Algorithm 300 can be used in combination with algorithm 200 to award power-ups or in-game awards to users as they mark spaces corresponding to such power-ups or in-game awards, to award points or other game credits to the user when they complete a bingo, and to provide other suitable features.

Although algorithm 300 is shown as a flowchart, algorithm 300 can also or alternatively be implemented as a state diagram, where the functional and decision blocks are implemented as states or state transitions.

Figure 4:
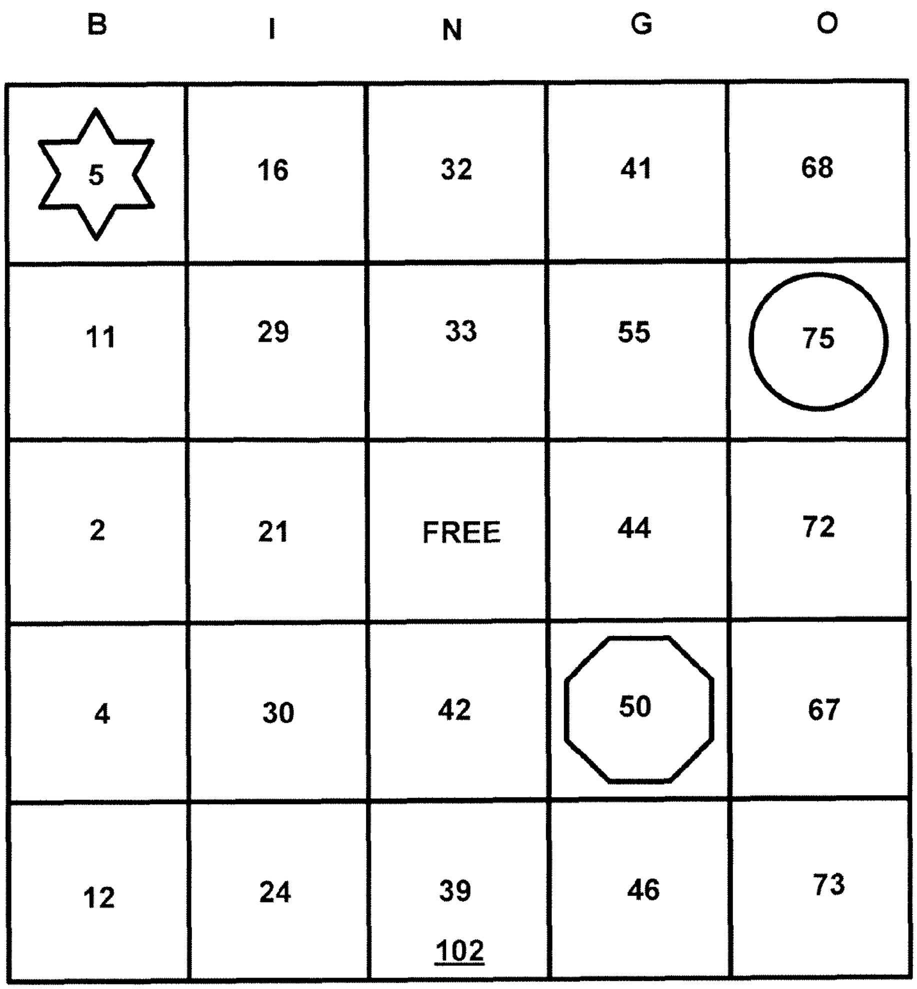
FIG. 4 is a diagram of a game card in accordance with an exemplary embodiment of the present disclosure.

FIG. 4 is a diagram of a game card 400 in accordance with an exemplary embodiment of the present disclosure. Game card 400 includes columns of five spaces for each of five corresponding letters of the word BINGO. Each of the spaces contains a random number for the associated letter, and where the center space is a free space. In addition, as shown on game card 400, some spaces of the game card are marked with power-up markers, such as B-5, G-50 and O-75. The different power-up markers can represent different power-up functionality. For example, the power-up marker on B-5 can be a power-up that awards additional experience points, such that when B-5 is called and the space is marked, the additional experience points can be awarded. Likewise, the power-up marker on G-50 can be a power-up that awards additional time on the countdown clock, so as to extend the amount of time for game play, such that when G-50 is called and the space is marked, the additional time can be added to the count-down clock. The power-up marker on O-75 can be a power-up that awards an instant bingo, such that when O-75 is called and the space is marked, the player is awarded an instant bingo win. For an instant bingo win, the player can be upgraded to the next card level, additional spaces can be marked to complete a bingo (such as a horizontal or vertical row), existing game card spaces that have associated numbers can be changed to “free” spaces (such as by using an algorithm that changes the state of an abject associated with one or more game card spaces from a number space to a free space), or other suitable processes can be used.

The spaces, power-up markers and other features of game card 400 can be implemented as one or more objects having associated graphical characteristics, data and functionality, can be implemented as characteristics of objects associated with the game card or the game card spaces having associated graphical characteristics, data and functionality, or can be implemented in other suitable manners.

Figure 5:
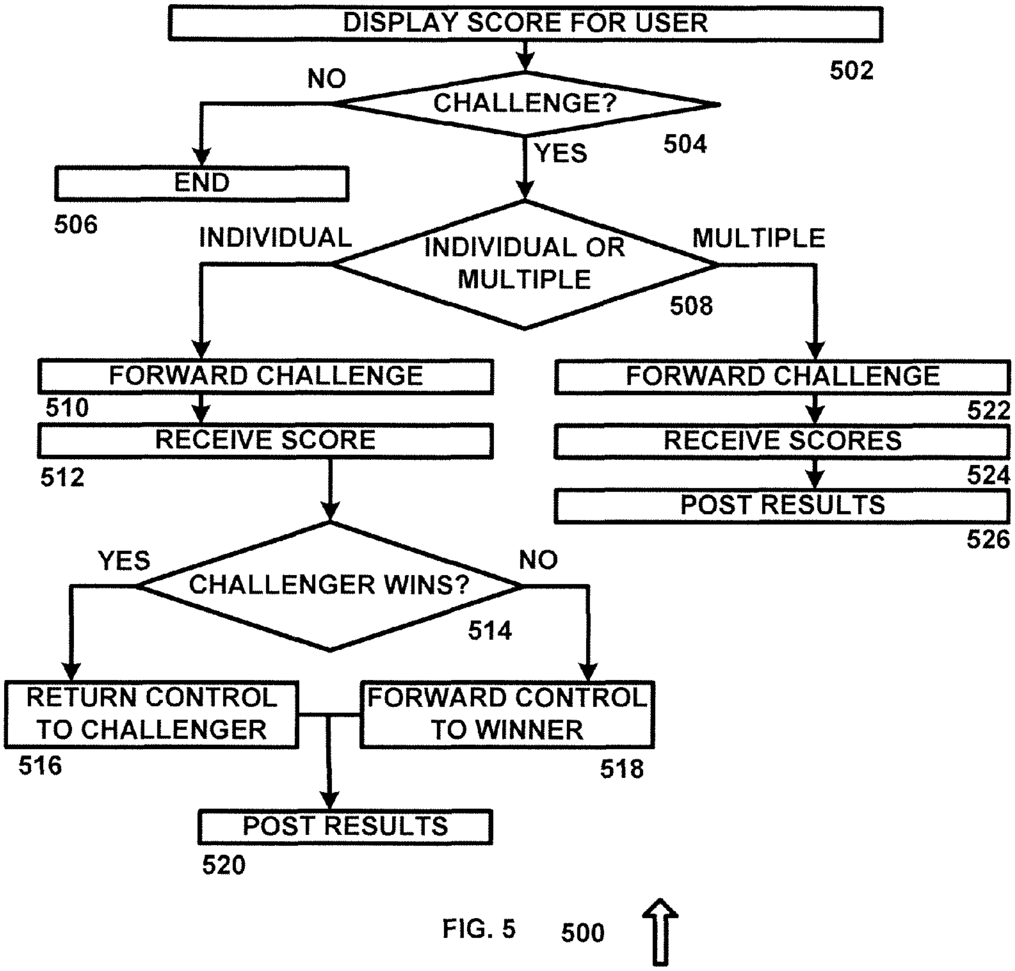
FIG. 5 is a diagram of an algorithm for challenge mode play in accordance with an exemplary embodiment of the present disclosure.

FIG. 5 is a diagram of an algorithm 500 for challenge mode play in accordance with an exemplary embodiment of the present disclosure. Algorithm 500 can be implemented as software operating on a general purpose processor, a reduced instruction set processor, a digital signal processor or other suitable processors, can be implemented in hardware, such as a field programmable gate array or an application-specific integrated circuit, or can be implemented in other suitable manners. The algorithm can be implemented using suitable programming processes, such as by defining variables representing the variable values described herein, by defining objects having state data and associated functionality, and by manipulating the variables, objects or other suitable coding constructs to implement the disclosed algorithms.

Algorithm 500 begins at 502, where a score is displayed to the user. In one exemplary embodiment, the score can be based on a number of experience points awarded during game play, a number of bingos that have been obtained by the user, the number of balls that have been played, a suitable combination of these metrics, or other suitable metrics. The algorithm then proceeds to 504.

At 504, a user selection to terminate or proceed with a challenge is received. In one exemplary embodiment, the user can activate a graphic control to either initiate a challenge or to proceed without initiating the challenge, can provide a verbal command using a speech recognition system, or can provide other suitable input. If it is determined at 504 that challenge mode has not been selected, the algorithm proceeds to 506 and ends. Otherwise, the algorithm proceeds to 508.

At 508, it is determined whether to initiate an individual challenge or multiple challenges, such as for a group or team. In one exemplary embodiment, a user can select an individual challenge control, such as where the user wishes to retain control over the challenge if the user prevails, and can further identify a single player to receive the challenge, such as by entering an email address, a player identifier, making a selection from a list or in other suitable manners. Likewise, the user can select multiple challenges by entering multiple email addresses, player identifiers, a team identifier, or other suitable identifiers for a group, such as where the user elects to surrender control over the challenge process and to create a multi-player event. The algorithm then proceeds to 510 if an individual challenge has been selected, and to 522 if multiple challenges have been selected.

At 510, the challenge is forwarded to the identified individual. In one exemplary embodiment, the challenge game will provide the same sequence of bingo balls and the same game cards, but can award different power-up or in-game awards in order to introduce a random element to the challenge. Likewise, every element of the challenge game can be selected to match the game that was played by the user that issued the challenge. The challenge can be forwarded as an object containing the relevant data sequences for replicating the game to the extent necessary or in other suitable manners. The algorithm then proceeds to 512.

At 512, the score achieved by the challenged player is received, such as at the challenging player's game system, the challenged player's game system, at a challenge management server, or at other suitable systems. The algorithm then proceeds to 514, where it is determined whether the challenger has won, such as by comparing the score metric or metrics of the challenger with the score metric or metrics of the challenged player. Likewise, rules for handling ties can also be implemented, such as awarding a tie to the challenger, awarding a tie to the challenged player, using a "coin flip" or other random event, or in other suitable manners. If it is determined that the challenger has won, the algorithm proceeds to 516, where control over the challenge is returned to the challenger. Otherwise, the algorithm proceeds to 518, where control over the challenge is transferred to the winning party, such as to allow the winning party to issue subsequent challenges. The algorithm then proceeds to 520, where the game results are posted, such as by posting the results to a website or other centralized location, by distributing the results to one or more users, or in other suitable manners.

If multiplayer challenge mode is selected at 508, the algorithm proceeds to 522, where the challenge is forwarded to multiple players. At 524, the scores from the other players are received, and the algorithm proceeds to 526, where the results are posted. Because the results from a multiplayer challenge may be received over an extended time period, such as if one of the challenged players responds quickly to the challenge and a second challenged player does not, coordination of multiplayer challenges can be difficult for the purposes of passing control to another winning player. Alternatively, multiplayer challenges can have an associated time limit, such that any challenged players that do not complete the challenge within the time limit receive a zero score, in which case control over the challenge can be transferred to the winning player. Likewise, for multiplayer challenges with transfer of control, additional tie-breaker functionality can be provided for resolving a single winner if there are two or more equal scores.

In another exemplary embodiment, the challenge mode can be implemented as a daily tournament, such as where a user can elect to receive the daily tournament challenge. In this exemplary embodiment, all users that request the daily tournament can be provided with a predetermined bingo game card or game cards and a sequence of game balls and power-ups or in-game awards, and the users can play the daily tournament and submit their score for comparison with other scores. In this exemplary embodiment, a centralized server or other system can implement an algorithm that tracks the user accounts or devices that have been provided with the daily tournament game, such as to ensure that each user account or device only submits a single daily tournament entry, to verify the submission time for an entry, or for other suitable purposes. Likewise, contestants can be grouped according to experience level, team, or in other suitable manners to provide additional daily tournament prize categories.

Figure 6:
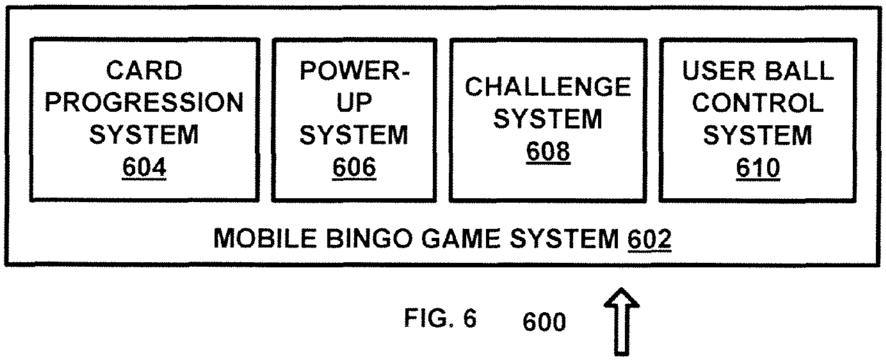
FIG. 6 is a diagram of a system for implementing a mobile bingo game in accordance with an exemplary embodiment of the present disclosure.

FIG. 6 is a diagram of a system 600 for implementing a mobile bingo game in accordance with an exemplary embodiment of the present disclosure. System 600 includes mobile bingo game system 602 and card progression system 604, power-up system 606, challenge system 608 and user ball control system 610, each of which can be implemented in hardware or a suitable combination of hardware and software, such as one or more software systems operating on a general purpose processing platform.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Mobile bingo game system 602 provides a mobile bingo gaming environment for control of a mobile bingo game. In one exemplary embodiment, mobile bingo game system 602 can implement features and functions described herein that are not otherwise provided by other systems of system 600.

Card progression system 604 controls a progression of bingo game cards for successive bingos. In one exemplary embodiment, when a player wins a first bingo on a game card, the game card can continue to be used to play to allow the player to obtain additional bingos. In this exemplary embodiment, power-ups or in-game awards associated with the card can be maintained, except where the power-up or in-game award was used to result in a bingo. The new game card can have different graphical attributes, such as color or border design, to allow a user to quickly identify cards on which previous bingos have been won.

Power-up system 606 controls the award and subsequent redemption of power-ups or in-game awards. In one exemplary embodiment, a player can receive credit towards a power-up or in-game award for each bingo card number that is properly marked, and an associated power-up indicator can display the progress towards the next power-up. When a power-up or in-game award is available, the user can activate the power-up or in-game award control, and a power-up or in-game award can be randomly assigned to one of the game cards that the user is playing, to each of the game cards that the user is playing, or in other suitable manners. Power-up system 606 can randomly select a power-up or in-game award from a set of available power-ups or in-game awards, such as to associate the power-up or in-game award to a number on a bingo cards, so that the when the associated number is properly marked, the user is awarded additional experience points, additional time on a count-down clock, additional balls that can be played after the expiration of the count-down clock, an instant bingo or other suitable power-ups or in-game awards.

Challenge system 608 controls challenge mode play, such as to allow a user to challenge other users to play the same game that that the challenging user played in order to see whether the other users can beat the challenging user's game metrics. Challenge system 608 can also or alternatively be implemented at a centralized server, such as to maintain the state of the challenge in the event that one or more challenged users do not respond to the challenge.

User ball control system 610 allows a user to request a next ball in a bingo game, such as by activating a suitable control. In one exemplary embodiment, user ball control system 610 can prevent a user from receiving a next ball if all spaces on the user's current bingo cards that match the currently displayed ball have not been properly marked by the user. In addition, a time penalty can be assessed by user ball control system, such as by deducting a predetermined amount of time from the time remaining on a countdown clock.

In one exemplary embodiment, a system for controlling a bingo game is provided that includes means for randomly selecting a first game number representing one of a predetermined set of game numbers of a bingo card using a processor. As described in greater detail herein, the means for randomly selecting the first game number representing one of the predetermined set of game numbers of the bingo card using the processor can include an algorithm that generates a random number selected from the number of bingo game card spaces remaining in a set of bingo game card spaces, such as where the set initially comprises 75 objects, variables or other suitable logic constructs that each represent a space that may be included in a set of 25 spaces on a bingo game card. In this exemplary embodiment, the set of bingo game card spaces can be represented as an array have a size N, where N is the number of possible bingo game card spaces, and where the value of each position in the array is the corresponding space number. In this exemplary embodiment, the initial array can include 75 spaces, having values [1, 2, 3 . . . 75]. A random number representing an integer between 1 and 75 can then be generated, for example, 2. The array of random numbers can then be modified by deleting the entry corresponding to 2, thus leaving 74 entries in the array having values [1, 3, 4 . . . 75]. In this exemplary embodiment, if the next random number is also 2, then the second entry in the array (3) can again be deleted, thus leaving 73 entries in the array having values [1, 4, 5 . . . 75]. Likewise, other suitable programming constructs other than arrays can be used, such as state machines, objects or tables.

The system can further includes means for displaying the first game number in an active number area on a display device associated with the processor. As described in greater detail herein, the means for displaying the first game number in the active number area on the display device associated with the processor can be implemented using one or more objects having associated graphical and metadata attributes, where an algorithm causes a display data value of the object to be set to the first game number (e.g. the number 2), and a display attribute to be set to generate a graphical icon on the user display that includes the first game number (e.g. a bingo ball with the number 2).

The system can further include means for receiving a user-entered command from a user interface device to randomly select a second game number. As described in greater detail herein, the means for receiving the user-entered command from the user interface device to randomly select the second game number can be implemented as an algorithm that detects when a next ball control on a touch sensitive user display has been activated, such as by monitoring a touch sensitive screen interface to determine whether a space corresponding to the next ball control has been touched by the user, where the algorithm translates the signal generated by the touch sensitive screen interface into a data signal.

The system can further include means for determining, with the processor, whether the first game number has been marked on each of one or more bingo game cards. As described in greater detail herein, the means for determining, with the processor, whether the first game number has been marked on each of one or more bingo game cards can include an algorithm that checks the state of each associated object of each game card that represents the space value of the game card to determine whether a number associated with that space is equal to the first game number. In one exemplary embodiment, the algorithm can compare the value associated with the first game number to a value stored in an object representing the corresponding space on the game card, such as where each game card has 75 objects, each representing one of the 75 possible numbers that can appear on a bingo game card. In this exemplary embodiment, 24 of the 75 objects for each game card can have attributes set that indicate that the number associated with the object should be displayed on a graphic interface that represents the game card, where one additional space is designated as a free space. Each object can likewise have a data value that indicates the relative position of the object within the game card (e.g. positions 1 through 5, where 1 is the top position in a column and 5 is the bottom position). The algorithm check each corresponding object for the space associated with the first game number for each game card to determine whether the display state for that object is "on" or "off."

The system can further includes means for randomly selecting a second game number representing a second of the predetermined set of game numbers using the processor, if the first game number has been marked where it appears on each of the one or more bingo game cards. As described in greater detail herein, the means for randomly selecting the second game number representing the second of the predetermined set of game numbers using the processor, if the first game number has been marked where it appears on each of the one or more bingo game cards can be implemented as an algorithm, where the algorithm checks the value of a first variable that represents a state that has been set after each of the game cards has been checked to determine whether the space corresponding to the first game value has 1) been displayed for that game card, and if so, if 2) the space has been marked. As described in further detail herein, a space on a game card can be marked when a user makes a selection on a touch screen corresponding to a displayed number on a game card, where a touch screen interface controller reads the user selection and generates a command that causes a display state for the displayed number to change from an unmarked state to a marked state.

The system can further includes means for deducting a predetermined time penalty from a countdown timer if the first game number has not been marked where it appears on each of the one or more bingo game cards. As described in greater detail herein, the means for deducting the predetermined time penalty from the countdown timer if the first game number has not been marked where it appears on each of the one or more bingo game cards can be implemented as an algorithm, where the algorithm checks the value of the first variable, and if the value of the first variable indicates that each space that is displayed on each game card has not been marked, then the algorithm deducts a predetermined amount from a register storing a current value of the countdown clock.

The system can further includes means for displaying the second game number in the active number area on the display device associated with the processor. As described in greater detail herein, the means for displaying the second game number in the active number area on the display device associated with the processor can be implemented as an algorithm, where the algorithm changes the state of an object that displays the value of the current ball on a user display to equal the value of the second game number.

The system can further include means for generating a ball hopper display on the display device that includes a graphical icon representing the first game number after displaying the second game number. As described in greater detail herein, the means for generating the ball hopper display on the display device that includes the graphical icon representing the first game number after displaying the second game number can be implemented as an algorithm that changes the value of an object associated with the ball hopper display to include a graphical icon that represents a bingo ball that displays the first game number. In this exemplary embodiment, the ball hopper display can include 75 objects, one for each possible ball that can be called in a bingo game. The 75 objects can each have a state variable that causes an icon to be generated that represents the associated bingo ball, and where the ball hopper display can further include control data that allows a user to scroll through the display, such as by activating a user touch screen control in a suitable manner (e.g. by dragging a finger or stylus across the touch screen display along the ball hopper display, where a touch screen controller detects the corresponding spaces on the touch screen display that have been activated, and where the algorithm translates the activates spaces into a command that causes the ball icons in the ball hopper graphical device to scroll in a selected direction.

The system can further include means for incrementing a status bar on the display device that includes a graphical icon representing a percentage of game numbers that have been played after displaying the second game number. As described in greater detail herein, the means for incrementing the status bar on the display device that includes the graphical icon representing the percentage of game numbers that have been played after displaying the second game number can include an object having associated graphical states that generate a user display icon that shows a status bar, where the status bar is progressively filled with each called ball. In one exemplary embodiment, the status bar can be an object having associated graphical states, such as a first state showing the status bar with no filled spaces, a second state showing the status bar with one filled space and so forth up to a $76^{th}$ state showing the status bar with 75 filled spaces. The algorithm can increment the fill state of the status bar as each ball is called.

Although certain exemplary algorithmic means have been explicitly described in detail, the FIGURES and associated descriptions thereof provide further algorithmic detail utilizing algorithms that change the state of objects based on user-entered commands. The user-entered commands can be entered using a suitable user interface device, such as a touch screen controller that detects locations on a display that the user has touched with a finger or stylus, a microphone that generates signals representing verbal commands, where the command are translated using a look-up table and speech recognition software, a keyboard interface where the keys are associated with various user commands through the use of a look-up table or variable values associated with each key of the keyboard interface, or in other suitable manners.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for controlling a bingo game using a processor, comprising:

receiving by the processor a selection of one or more bingo cards;

randomly selecting by the processor a first game number from a predetermined set of game numbers;

displaying by the processor the first game number in an active number area on a display device associated with the processor;

receiving by the processor a user-entered command from a user interface device to randomly select a second game number;

responsive to the user-entered command, determining, by the processor, whether the first game number has been marked on each of the one or more bingo game cards on which the first game number appears;

responsive to determining that the first game number has not been marked on each of the one or more bingo cards on which the first game number appears, deducting by the processor a predetermined time penalty from a countdown timer; and responsive to determining that the first game number has been marked on each of the one or more bingo cards on which first game number appears, randomly selecting by the processor the second game number from the predetermined set of game numbers.

2. The method of claim 1 further comprising:

displaying by the processor the second game number in the active number area on the display device associated with the processor; and generating by the processor a scrolling ball hopper display on the display device that includes a graphical icon representing the first game number after displaying the second game number.

3. The method of claim 1 further comprising:

displaying by the processor the second game number in the active number area on the display device associated with the processor; and incrementing by the processor a status bar on the display device that includes a graphical icon representing a percentage of game numbers that have been played after displaying the second game number.

4. The method of claim 1 further comprising:

generating by the processor a ball hopper display on the display device that includes a graphical icon representing a plurality of game numbers after displaying each of the plurality of game numbers in the active number area; and receiving by the processor a user command to scroll the plurality of game numbers in the ball hopper display to display graphical icons representing game numbers that are not shown on the display device.

5. The method of claim 1 further comprising:

displaying by the processor the second game number in the active number area on the display device associated with the processor; and incrementing by the processor a progress indicator for a power-up display on the display device that includes a graphical icon representing progress towards eligibility for a power-up award.

6. The method of claim 1 further comprising receiving by the processor a user command to exchange a credit to receive a power-up award.

7. The method of claim 6 further comprising:

randomly selecting by the processor one of a plurality of power-up awards from saved power-up awards for a user;

randomly selecting by the processor one of a plurality of spaces on one of the bingo game cards; and modifying by the processor a graphical display showing the bingo game cards to indicate the space associated with the power-up award.

8. The method of claim 7 further comprising:

receiving by the processor a user-entered indication that the space associated with the power-up award should be marked;

determining by the processor whether the first game number corresponds to a number in the marked space; and responsive to determining that the first game number corresponds to a number in the marked space, awarding by the processor the power-up award.

9. The method of claim 8 wherein awarding the power-up award comprises adding by the processor a predetermined amount to an experience point total.

10. The method of claim 8 wherein awarding the power-up award comprises adding by the processor a predetermined amount of time to the countdown timer.

11. The method of claim 8 wherein awarding the power-up award comprises setting by the processor a control to allow game play to continue for one or more additional randomly-selected game numbers after the countdown timer has expired.

12. A system for controlling a bingo game comprising:

algorithm means for receiving a selection of one or more bingo cards;

algorithm means for randomly selecting a first game number from a predetermined set of game numbers;

means for displaying the first game number in an active number area on a display device associated with the processor;

algorithm means for receiving a user-entered command from a user interface device to randomly select a second game number;

algorithm means for, responsive to the user-entered command, determining whether the first game number has been marked on each of the one or more bingo game cards on which the first game appears;

algorithm means for, responsive to determining that the first game number has not been marked on each of the one or more bingo cards on which the first game number appears, deducting a predetermined time penalty from a countdown timer;

algorithm means for, responsive to determining that the first game number has been marked on each of the one or more bingo cards on which first game number appears, randomly selecting the second game number from the predetermined set of game numbers; and a processor for executing each of the algorithm means.

13. The system of claim 12 further comprising:

algorithm means for displaying the second game number in the active number area on the display device associated with the processor; and algorithm means for generating a ball hopper display on the display device that includes a graphical icon representing the first game number after displaying the second game number.

14. The system of claim 12 further comprising:

algorithm means for displaying the second game number in the active number area on the display device associated with the processor; and algorithm means for incrementing a status bar on the display device that includes a graphical icon representing a percentage of game numbers that have been played after displaying the second game number.

15. The system of claim 12 further comprising:

algorithm means for generating a ball hopper display on the display device that includes a graphical icon representing a plurality of game numbers after displaying each of the plurality of game numbers in the active number area; and algorithm means for receiving a user command to scroll the plurality of game numbers in the ball hopper display to display graphical icons representing game numbers that are not shown on-screen.

16. A method for controlling a bingo game comprising:

receiving by the processor a selection of one or more bingo cards;

randomly selecting by the processor a first game number from a predetermined set of game numbers card;

displaying by the processor the first game number in an active number area on a display device associated with the processor;

receiving by the processor a user-entered command from a user interface device to randomly select a second game number;

responsive to the user-entered command, determining, by the processor, whether the first game number has been marked on each of the one or more bingo game cards on which the first game number appears;

awarding by the processor a bingo if a bingo has occurred;

responsive to determining that the first game number has not been marked on each of the one or more bingo cards on which the first game number appears, deducting by the processor a predetermined time penalty from a countdown timer; and responsive to determining that the first game number has been marked on each of the one or more bingo cards on which first game number appears, randomly selecting by the processor the second game number from the predetermined set of game numbers.

17. The method of claim 16 further comprising:

randomly selecting by the processor one of a plurality of stored power-up awards that have been previously acquired by a user; and marking by the processor a first space of a first game card with a power-up indicator, wherein the power-up is awarded if the first space is marked.

18. The method of claim 17 further comprising incrementing by the processor a progress indicator for a power-up award as a function of a number of spaces marked by a user.

19. The method of claim 17 further comprising:

randomly selecting by the processor a second of the plurality of stored power-up awards that have been previously acquired by a user; and marking by the processor a second space with a power-up indicator, wherein the power-up is awarded if the second space is marked, and where the award associated with the second power-up award is different from the award associated with a first power-up award.

20. The method of claim 17 wherein the power-up award causes the processor to mark a bingo on the first game card.

* * * * *